ns patent Office 2,798,875
Patented July 9, 1957

2,798,875

CHLORINATED HYDANTOINS

Walter E. Scheer, New Canaan, Conn., and M. Frank Levy, St. Albans, N. Y., assignors to Argus Chemical Corporation, Brooklyn, N. Y.

No Drawing. Application May 29, 1956,
Serial No. 587,968

2 Claims. (Cl. 260—309.5)

The present invention relates to a new compound containing active chlorine and to a method of preparing the same. It relates more particularly to 1,3-dichloro-5-methyl-5-carboxyethyl-hydantoin made by chlorination of hydantoin derived from levulinic acid.

Chlorinated hydantoins are widely used for bleaching and disinfecting purposes. Especially di-chloro-di-methyl dydantoin (DDH) is a very valuable bleaching and decontaminating agent. It is at present replacing other compounds containing active chlorine, such as chlorinated lime, or sodium-and calcium hypochlorite, to a constantly increasing extent. It is valuable on account of its stability, when packaged as a dry powder. Furthermore, there is less risk of causing damage to textile fibers by the use of DDH than by the use of one of the above mentioned chlorine-containing products.

However, DDH has one serious drawback; it is very poorly soluble in water even at an alkaline pH. This fact cuts down its bleaching activity. The same inconvenience is observed in other known chloro hydantoins, as for instance the ones protected by U. S. Patents 2,398,598 and 2,398,599.

It is the special object of the present invention to overcome this drawback by providing a chlorinated hydantoin, which still contains a free carboxyl group. This group imparts to the compound good solubility in water at an alkaline pH. Such a product can be prepared by chlorination of the hydantoin derived from a keto acid, e. g. levulinic acid. The chlorinated compound combines stability and safety with higher activity.

Levulinic acid is a potentially cheap material; since the starting materials for the production of levulinic acid, like sugar, molasses, starch, etc. are inexpensive, levulinic acid can be made at very low price, when produced in sufficiently large quantities. The hydantoin derived from levulinic acid and corresponding to the formula

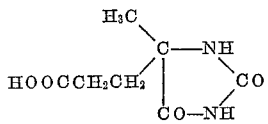

is described in the literature (Journ. Amer. Chem. Soc. 64,523 (1942)).

Substitution of the two hydrogen atoms linked to the nitrogen atoms, by chlorine, yields the corresponding dichloro compound which has the chemical name 1,3-dichloro-5-methyl-5-carboxyethyl hydantoin.

In the following, the invention will be illustrated by an example describing the preparation of the hydantoin and of its dichloro compound, but it should be understood that the description is given by way of exemplication and not of limitation, and that many changes in the details can be made without departing from the spirit of the invention.

EXAMPLE

*Preparation of 5-methyl-5-carboxyethyl-hydrantoin*

To a solution of 181 grams ammonium carbonate in 200 cc. water are added 46.4 grams freshly distilled levulinic acid. When the effervescence has subsided, 39 grams sodium cyanide are added and the mixture is heated to 70–80° C. for 2 hours. The temperature is then raised to 90° C. for one additional hour. Subsequent acidification with 20 cc. 6 n $H_2SO_4$ followed by continuous extraction with ethyl acetate, yielded 65.7 grams hydantoin, M. P. 157–158° C.

*Preparation of 1,3-dichloro-5-methyl-5-carboxyethyl hydantoin*

58.6 grams (0.315 mole) of the above hydantoin are dissolved in a solution of 50.0 grams (0.472 mole) $Na_2CO_3$ in 300 cc. water. This solution, which has a pH 9.2, is gassed at room temperature with chlorine, until the pH drops to 7, whereby a slight exothermic effect is observed. The introduction of chlorine is discontinued and the pH adjusted to 3.1 by addition of 3 n HCl. Thereafter the reaction product is shaken 6 times with 100 cc. methylene dichloride each time, and the methylene dichloride extracts are combined. After evaporation of the solvent, 53.9 grams of a syrup are obtained which solidifies after short standing forming white crystals of an M. P. 120° C.

The analysis of the product shows 27.6% active chlorine (calc. 27.8%). After standing for about two days, the aqueous liquors precipitate 3.56 grams of a crystalline monochloro derivative of a M. P. 135.27° C. Active Cl found 15.3%, calc. 15.75%.

It should be understood that in the chlorination instead of $Na_2CO_3$ any other water soluble alkaline agent can be used with equally good effect.

What we claim is:

1. The 1,3-dichloro-5-methyl-5-carboxyethyl hydantoin of the formula

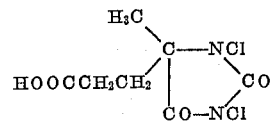

2. The method of reacting 5-methyl-5-carboxyethyl-hydantoin with chlorine in an aqueous alkaline solution until the pH drops from about 9.2 to about 7 and thereafter discontinuing the chlorination and adjusting the pH with acid to a desired acidity.

References Cited in the file of this patent

UNITED STATES PATENTS

| | | |
|---|---|---|
| 2,430,233 | Magill | Nov. 4, 1947 |
| 2,658,912 | Pfister et al. | Nov. 10, 1953 |